June 23, 1959

J. J. PIPPENGER 2,891,516

SELECTOR VALVE FOR CONTROLLING THE DIRECTION
AND SPEED OF MOVEMENT OF AN
ASSOCIATED FLUID MOTOR

Filed Oct. 25, 1956

INVENTOR.
John J. Pippenger
BY
Harness, Dickey & Pierce
ATTORNEYS

June 23, 1959 J. J. PIPPENGER 2,891,516
SELECTOR VALVE FOR CONTROLLING THE DIRECTION
AND SPEED OF MOVEMENT OF AN
ASSOCIATED FLUID MOTOR
Filed Oct. 25, 1956 7 Sheets-Sheet 7

FIG. 13.

INVENTOR.
John J. Pippenger
BY
Harness, Dickey & Pierce
ATTORNEYS.

United States Patent Office 2,891,516
Patented June 23, 1959

2,891,516

SELECTOR VALVE FOR CONTROLLING THE DIRECTION AND SPEED OF MOVEMENT OF AN ASSOCIATED FLUID MOTOR

John J. Pippenger, Manchester, Mich., assignor to Double A Products Company, Manchester, Mich., a corporation of Michigan Application October 25, 1956, Serial No. 618,229

16 Claims. (Cl. 121—45)

This invention relates generally to valves, and more particularly to an improved selector valve connectible in a hydraulic or fluid system to control the direction and speed of movement of an associated fluid motor, and is a continuation-in-part of applicant's copending application Serial No. 489,875, filed February 23, 1955, now abandoned.

In machine tools, it is often desirable or necessary that a moving member, such as a member carrying a cutting tool or the like, be operable for movement in opposite directions and at different speeds so as to perform various operations. While the selector valve of this invention is not limited for use in the machine tool field, it has special utility in such field, wherein the moving member of a machine tool is operated by hydraulic or fluid motor means.

It is, therefore, an object of this invention to provide a selector valve of the aforementioned type which can be actuated so as to direct fluid from a pressure source to a fluid motor in such a manner that the motor may be moved in opposite directions and at different speeds.

It is a further object of this invention to provide a selector valve of the aforementioned type which may be actuated at any time to stop the movement of an associated fluid motor irrespective of the position of the latter. This feaure is exceptionally important in the machine tool field wherein it permits the movement of the moving member of the machine tool to be stopped at any time so as not to damage the tool or work and so that if the movement of the moving member is stopped it can be continued at any time without having to return to its initial starting position.

It is a still further object of this invention to provide a selector valve of the aforementioned type which may be mounted on a machine tool or the like and be automatically actuated in accordance with the position of the machine tool moving member.

It is a still further object of this invention to provide a selector valve of the aforementioned type which is of the pilot-operated, solenoid-controlled type, so that it may be easily and positively operated at all times.

It is a still further object of this invention to provide a selector valve of the aforementioned type which is relatively inexpensive to manufacture, especially efficient in operation, and durable in construction.

These and other objects of this invention will become apparent from the following detailed description, taken in conjunction with the accompanying drawings, in which.

Referring now to the drawings and more particularly to Figures 1 to 9, it will be seen that the selector valve 13 of this invention may be connected in any suitable hydraulic circuit, but for purposes of illustration is being illustrated as in a hydraulic circuit of the type having a hydraulic pump and reservoir unit 21, which is connected, as will be hereinafter described, to the main portion of the selector valve by conduits 23 and 25. The selector valve in turn is connected by suitable conduits 27 and 29 with a fluid motor 31 of the type including a cylinder 33 having a piston 35 therein with a piston rod 37 connected to the piston and extending through at least one end of the cylinder. The fluid motor 31 is adapted to be connected, for example, to a moving member of a machine tool to move the same in opposite directions. It will be appreciated in the machine tool field that it is often desirable for the moving member to move at different speeds throughout its travel during, for example, a cutting operation. Likewise, it is important that the moving member can be stopped at any time during such movement to prevent damage to either the work or tool. It is, likewise, desirable that the moving member be able to continue its movement after it has been stopped, without returning to its initial starting position. The selector valve of this invention is designed to control the movement of the fluid motor and thus a moving member of, for example, a machine tool, to permit the aforementioned operations to take place efficiently and easily, and, if desired, automatically.

Figure 1:
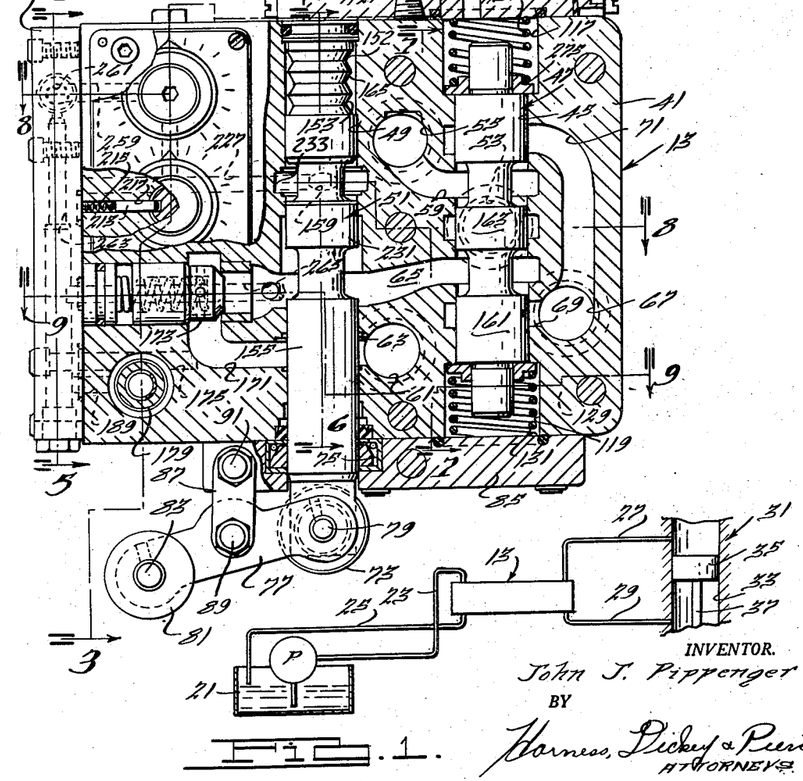
Figure 1 is a schematic view illustrating the manner in which the selector valve of this invention may be connected with a source of fluid under pressure and with a fluid-actuated motor.
Figure 2:
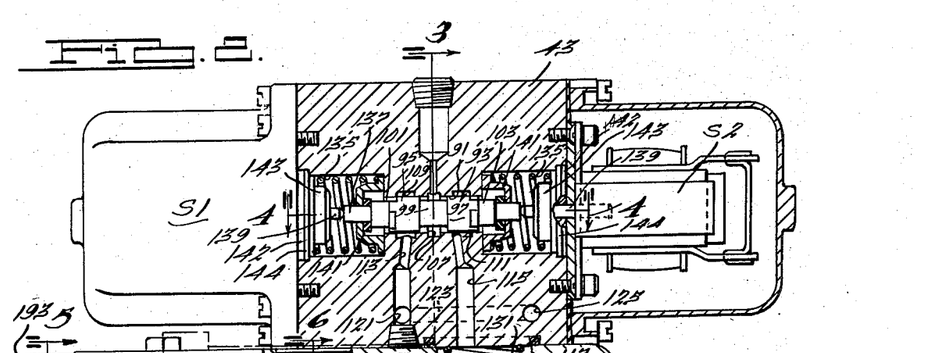
Fig. 2 is a side view, partially in section and partially in elevation, of a selector valve of this invention.

As can be best seen in Fig. 2, the selector valve 13 includes a main housing 41 having a pilot spool housing 43 connected therewith in any suitable manner. The main housing includes a first bore 45 in which a first spool 47, which may be called a directional spool or valve, is slidably disposed. The housing 41 also includes a second bore 49 in which a second spool 51, which may be called a diversion spool or valve, is slidably disposed. Housing 41 includes a first port 53 which is adapted to be connected to the conduit 23, through passage 54 (Fig. 7), to supply fluid under pressure to the main valve from the pump 21. The port 53 communicates with the bore 45 intermediate the ends thereof. A second port 55 is provided in housing 41 and is connectible with conduit 27, which in turn is connected with the fluid motor 31. The port 55 is connected with the first bore 45 through a suitable passageway and annular bore groove 59 in the housing 41. Housing 41 is provided with a third port 61 which is connected with the conduit 29 leading to the fluid motor 31 on the opposite side of the piston 35 from the conduit 27. Port 61 communicates with second bore 49 through a passage and annular bore groove 63. The second bore 49 in turn is connected with the first bore 45 through a passage 65 in the housing 41. A fourth port 67 is provided in housing 41, which is connectible with conduit 25 leading to the fluid reservoir 21, and thus acts as a tank port which is connected with the bore 45 adjacent the opposite ends thereof by means of a passageway and groove 69 and a passageway and groove 71. Suitable means are provided for actuating the second spool 51 to vary its position in the bore 49. While various actuating means may be incorporated, a cam and roller arrangement is illustrated in Fig. 2, wherein a roller 73 is supported on one end of the spool 51 beyond the confines of housing 41.

In this connection it will be noted that a suitable seal 75 is provided in the housing 41 for preventing leakage of fluid past the lower end of the spool. One end of a crank arm 77 is pivotally supported on a pin 79 which connects the roller 73 with the spool and with the crank arm. A roller 81 is journalled on a pin 83 carried in the opposite end of the crank arm. The intermediate portion of the crank arm 77 is pivotally connected with an end cap 85, bolted to the lower face of the housing 41, by means of links 87 pivoted to the crank arm at 89 and to the end cap 85 at 91. Therefore, if the selector valve is mounted adjacent a moving member of a machine tool or the like, having suitable cams thereon, the engagement of the roller 73 with the cams will move the spool 51 inwardly to its innermost position, as illustrated in Fig. 2, from its outermost position, so as to vary the speed of movement of the fluid motor 31. When the machine tool moving member reaches the end of its travel, a cam may engage the roller 81 to return the spool 51 to its outermost position automatically. The selector valve illustrated in Fig. 2 is of the type which may be actuated to cause the motor to stand still, or dwell, move in one direction at three different speeds, and move in an opposite or return direction. Therefore, the spool 51 assumes three different positions in accordance with its actuation in order to obtain the three speed motor operation.

The position of the first spool 47 is controlled by means of a solenoid-operated pilot valve disposed in the pilot valve housing 43. The pilot valve includes a bore 91 in which is slidably supported a spool 93. The spool is provided with longitudinally spaced lands 95 and 97. The spool 93, intermediate the lands 95 and 97, is reduced in diameter at 99 and the opposite ends of the spool, outwardly of the lands 95 and 97, are reduced in diameter at 101 and 103 respectively. The housing 43 is provided with an inlet pressure passage 105 (Fig. 3), which is connected with a housing passageway 106 (Fig. 7), which in turn communicates with main pressure passage 54 for supplying fluid under pressure to the bore 91, which communicates with the passage 105 through an annular bore groove 107. Fluid under pressure could, of course, be supplied to bore 91 from a separate fluid pump, if desired, instead of from the main pump 21. Longitudinally spaced annular grooves 109 and 111 are provided adjacent opposite ends of the bore 91 and communicate with passages 113 and 115 respectively in the housing 43. Passage 115 communicates with a recess 117 in the main valve housing 41 in which the upper end of the valve spool 47 is disposed, while passage 113 communicates with a recess 119 in the lower end of the housing 41 in which the lower end of the spool 47 is disposed. The latter communication is effected through passages 121, 123 and 125 in housing 43 and through a passage 127 extending downwardly through housing 43 and housing 41 to a passage 129 in the lower end of housing 41, which in turn communicates with the recess 119. It will be noticed that springs 131 are provided in recesses 117 and 119 for normally retaining spool 47 in a neutral centered position, as illustrated.

The opposite ends of pilot spool 93 are disposed in recesses 135 in the housing 43. The pilot spool 93 has reduced end portions 137 which are slidably supported in suitable bushings in cup-shaped washer assemblies 141. A pin 139 abuts each end of the spool and is slidably supported in bushings 142 and extends through a cup-shaped washer 143 which encompasses a portion of the bushings. An O-ring 144 prevents any fluid in the recesses 135 from leaking into solenoids S1 and S2 connected with the opposite ends of the housing 43. The solenoids S1 and S2, upon actuation, are adapted to shift the spool 93 either to the right or left, as illustrated in Fig. 2, to control the flow of fluid to or from the recesses 117 and 119, so as to shift the position of the first main spool 47. A coil spring 146 is disposed in each recess 135 and abuts washers 141 and 143, and thus return the valve spool to its neutral position when the solenoids are de-energized. The opposite ends of the pilot spool bore 91 communicate with the interior of the cup-shaped washers 141, which in turn have apertures (not shown) so that fluid will collect in recesses 135 and will return to reservoir through passage 148 and drain passages 160, hereinafter described.

Figure 6:
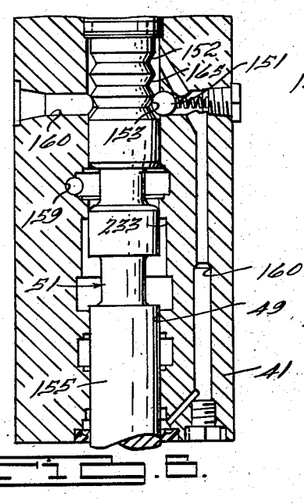
Fig. 6 is an enlarged fragmentary sectional view of the structure illustrated in Fig. 2, taken along the line 6—6 thereof.
Figure 7:
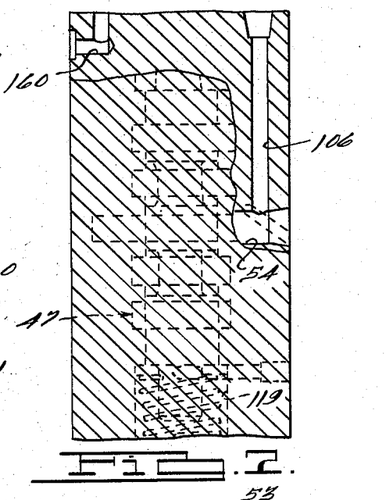
Fig. 7 is an enlarged fragmentary sectional view of the structure illustrated in Fig. 2, taken along the line 7—7 thereof.
Figure 8:
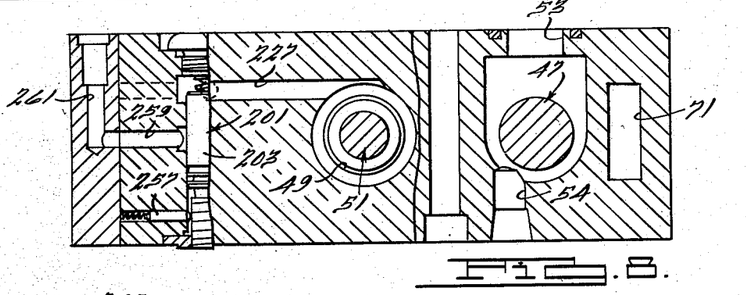
Fig. 8 is an enlarged sectional view of the structure illustrated in Fig. 2, taken along the line 8—8 thereof.
Figure 9:
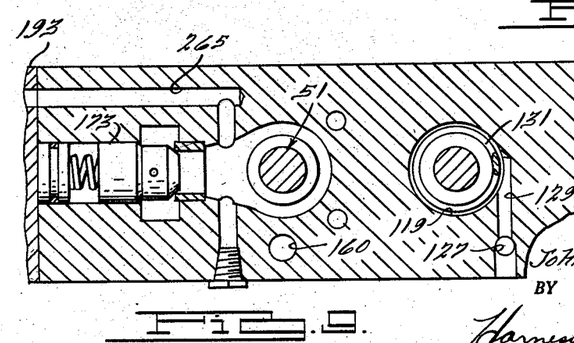
Fig. 9 is an enlarged sectional view of the structure illustrated in Fig. 2, taken along the line 9—9 thereof.

Assuming that the piston 35 of the fluid motor 31 is in its fully retracted or "back" position, and that an associated moving member of a machine tool is in its retracted position prior to initiating a cutting operation or the like, the spool 51 is disposed in its fully "out" position wherein it will be releasably held by a ball detent 151 which engages a groove 153 on the upper end of the spool 51, as can be clearly seen in Fig. 6. When the spool 51 is in such a position, spool land 155 is disposed outwardly of passageway 63 so that passageway 63 can communicate through bore 49 with passage 65. Likewise, when spool 51 is in this position, a port 159, which communicates with the bore 49 and with certain speed control valve mechanisms, is blocked so that there can be no flow through the speed control valves, as will be hereinafter described. Spool 47 is normally disposed in the neutral position shown wherein port 53 is blocked so that no fluid under pressure can flow through the main valve and to the fluid motor. Likewise, both solenoids S1 and S2 are de-energized so that the pilot spool will be in a neutral position wherein the lands 95 and 97 of spool 93 prevent a flow of fluid under pressure to bore grooves 109 and 111 and thus to passages 113 and 115, and the passages are connected through the pilot valve to the fluid reservoir, so that springs 131 maintain spool 47 in its neutral position. Suitable drain passages, such as those indicated at 160, are provided in the housings for carrying any fluid which may leak past any spools to the reservoir.

When it is desired to move the piston forwardly at a rapid speed and thus move an associated moving member of a machine tool at a similar speed, solenoid S1 is energized so as to move the spool 93 to the right, as viewed in Fig. 2, thus permitting fluid under pressure to flow through passageway 115 and into recess 117 to act against the upper end of the spool and move the same outwardly or downwardly. Fluid in the opposite recess 119 will flow through the passages 129, 127, 125, 123, 121, 113 and into bore 91 and then to the reservoir. When the spool 47 is thus shifted, spool land 161 will move downwardly or outwardly so as to communicate passageway 69 and port 67 with the bore 45 and with passageway 65 so that fluid may flow from the fluid motor cylinder through conduit 29, port 61, passageway 63, bore 49, passageway 65, bore 45, passageway 69, port 67 and conduit 25 to tank. Likewise, the shifting of the spool 47 will move spool land 163 downwardly so as to open port 53 to permit fluid under pressure to flow through bore 45 to passage 59 and port 55 and through conduit 27 to the fluid motor 31 so as to cause piston 35 to move forwardly at a rapid rate.

When it is desired to slow down the rate of movement of piston 35 and thus the rate of movement of an associated machine tool moving member, spool 51 is shifted to an intermediate position between its fully "in" and fully "out" positions. This may be done by engagement of a cam on a machine tool with the roller 73, or in any other suitable manner. The shifting of the spool 41 to its intermediate position will cause ball detent 151 to engage in a groove 165 in the end of the spool 51, to releasably retain the same in the intermediate position. When the spool 51 is in this position, the flow of fluid returning to tank is restricted so as to slow up the movement of the piston 35. This results from the fact that spool land 155 blocks the flow of fluid from the passage 63 through the bore 49 to passage 65. Fluid, therefore, flows from port 61 through passage 63 around the spool 51 into a passage 171.

Figures 3, 4, 5:
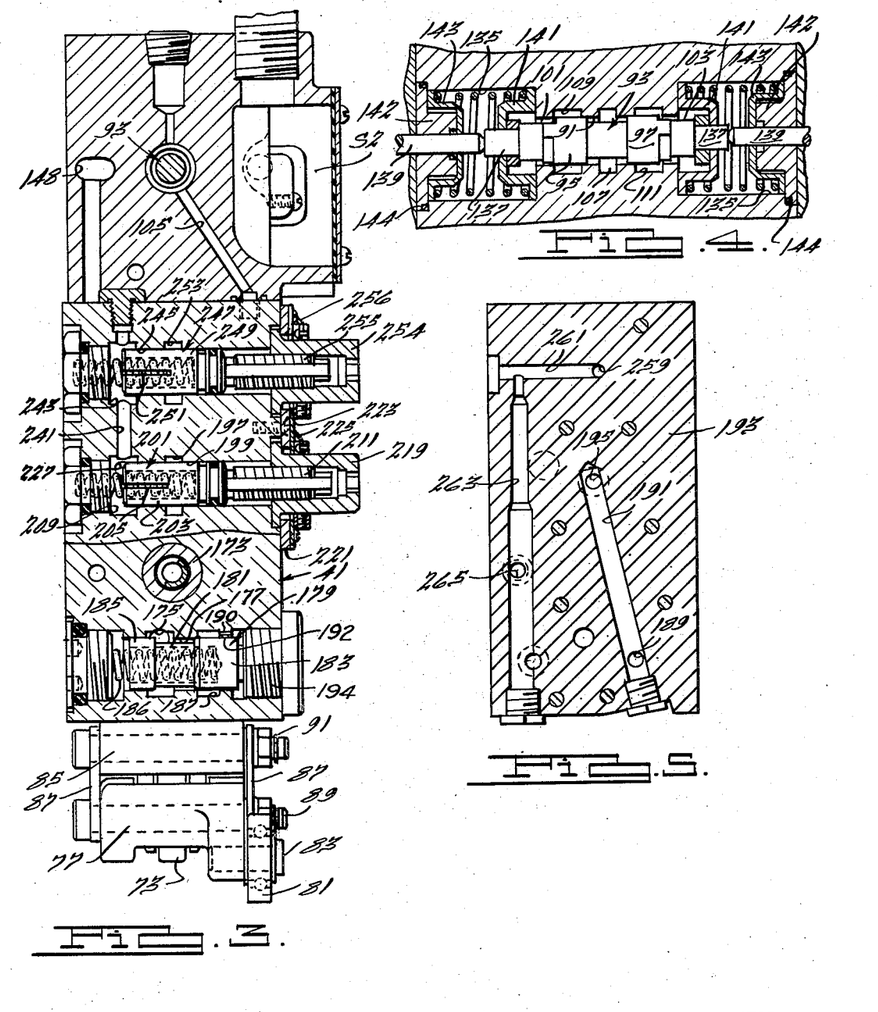
Fig. 3 is an enlarged sectional view of the structure illustrated in Fig. 2, taken along the line 3—3 thereof.
Fig. 4 is an enlarged sectional view of the structure illustrated in Fig. 2, taken along the line 4—4 thereof.
Fig. 5 is an enlarged fragmentary sectional view of the structure illustrated in Fig. 2, taken along the line 5—5 thereof.

A check valve 173 closes the upper or inner end of the passage 171 so that fluid can flow freely from passage 65 to port 63 for rapid return movement of the piston 35, as will be hereinafter described, regardless of the position of spool 51, but flow from port 63 to passage 65 is blocked by check valve 173 so that the spool 51 will control the speed of movement of piston 35 on the forward or work stroke. Normally, the fluid flowing into passage 171 will flow through a passage 175 into the bore 177 of a pressure compensating valve 179, as can be best seen in Fig. 3. The pressure compensating valve is of the type having a spring-loaded spool 181 therein and having a pair of spaced lands 183 and 185. The pressure compensating valve is provided to maintain a constant fluid pressure flow to the other speed-control valve mechansims at all times and irrespective of the pressure supplied by the pump or flowing from the cylinder of the fluid motor. The spring 186 of the valve resiliently moves the spool to the right, as seen in Fig. 3, to maintain it in a fully open position wherein passage 175 is in communication with a groove 187 in the bore 177, which in turn is in communication with an outlet passage 189 (Fig. 2). Fluid flows from groove 187 through an orifice 190 in land 192 into the space between the end of the valve spool 181 and plug 194. If the fluid pressure acting against the end of the spool exceeds the spring pressure, the spool will shift to the left to restrict the flow of fluid from the passage 175 to passage 189 and in this way maintain a constant pressure on the down stream side of the pressure compensating valve. The fluid flowing from the pressure compensating valve will flow through passage 189 into a passageway 191 in a manifold 193 connected to the housing 41, as can be clearly seen in Figs. 2 and 5. The fluid will then flow from passage 191 into a passage 195 and into an annular groove 197 extending around the bore 199 of an adjustable speed-control or restriction valve 201. The valve 201 includes a spool 203 having a notch or slot 205 extending inwardly from the left hand end thereof, as seen in Fig. 3. The notch 205 communicates with the groove 197 so that fluid can flow through the notch 205 and into an annular groove 209 disposed outwardly of the spool 203. The speed of movement of the piston 35 of the fluid motor depends upon the amount of restriction in the valve 201. The amount of restriction can be varied by varying the longitudinal position of the spool 203 to bring more or less of the notch 205 in communication with the bore groove 197. The amount of restriction can be varied by a machine operator setting the valve to the desired amount of restriction. In this connection, the spool is provided with a threaded shank 211 which is held against rotation by a pin 213 (Fig. 2) urged inwardly by a spring 215 in a passageway 217 in the housing 41. Threadably connected with the shank 211 is a dial knob 219 which is rotatably supported in the housing by a cover plate 221. A dial indicator plate 223 is provided adjacent the knob and a pointer 225 is provided on the knob so that by turning the knob the longitudinal position of the spool will vary, and the dial plate is calibrated so that the operator, by visual indication, knows the amount of restriction being placed in the valve. Fluid will flow from the valve groove 209 outwardly through a passageway 227 into the port 159, which communicates with the bore 49. The spool land 231 is disposed below the upper end of bore groove 233 so that fluid can flow through the bore 49 to passage 65 and thence into bore 45, passage and groove 69, through port 67 and back to tank. In many machine tool cutting operations, this speed of movement of the fluid motor and machine tool moving member is termed a coarse-feed speed.

If it is desired to additionally slow down the feeding of the machine tool moving member and, therefore, the speed of movement of piston 35 of the fluid motor, the spool 51 is moved to its fully "in" position as shown in Figs. 2 and 6, wherein ball detent 151 will engage annular groove 153 to releasably retain the same in such position. When the spool 51 is in this position, fluid under pressure from port 53 will again flow to port 55 and through conduit 27 to the fluid motor, as previously described, and fluid will flow from the opposite end of the fluid motor through port 61 and valve 201, as previously described, but as port 159 and thus passage 227 is now blocked by the spool land 231, fluid will flow from the outlet groove 209 of valve 201 through a passageway 241 into an annular groove 243 extending around a bore 245 of a second restriction or speed-control valve 247. The restriction valve 247 is constructed substantially identically with the valve 201 and thus has a spool 249 having a notch 251 therein, which communicates the groove 243 with a longitudinally spaced annular bore groove 253. The amount of restriction imparted in the valve 247 is controlled in the same manner as with valve 201 by the provision of a knob 254 connected with a threaded shank 255 of spool 249, which shank is prevented against rotation by a pin 257 and the knob is rotatably supported in the housing by the cover plate 221. The indicator plate 223 has markings adjacent the knob 254 so that the pointer 256 of this knob can be turned to a particular indicator marking to set a predetermined amount of restriction in the valve 247. Fluid will flow from groove 253 of valve 247 through a passage 259 into passage 261 and thence through passage 263 into a passage 265 which communicates with passage 65, thence through bore 45 to passage 69 to port 67 and conduit 25 to tank. Therefore, as fluid returning from port 61 to port 67 goes through two restriction valves, the rate of movement of the fluid motor, as well as the moving member of the associated machine tool, will be considerably slower, thus permitting, for example, fine feed cutting operations to take place.

It will be appreciated that the movement of the fluid motor, as well as the associated tool, may be stopped at any time by merely de-energizing both solenoid S1 and S2, thereby returning the pilot spool 93 to its neutral position, whereupon the springs 131 will return spool 47 to its neutral position wherein spool land 163 will block port 53 and prevent any further flow of fluid to the fluid motor, thus causing the fluid motor to dwell at any desired point. When thereafter it is desired to start the fluid motor, it is merely necessary to energize either of the pilot spool solenoids and the motor will continue to operate and move in the desired direction. As has been previously pointed out, it is extremely desirable in the machine tool art to be able to stop the movement of the moving member at any time and to thereafter be able to continue the movement without having the member return to its initial starting position.

When the moving member of the machine tool reaches the end of its movement, it may dwell or return at once.

A cam or some other means for returning the spool 51 to its initially fully "out" starting position may be provided on the machine to engage the roller 81 on the crank arm 77 to perform this function during the return stroke. When it is desired to return the fluid motor and associated machine tool moving member to their initial position, solenoid S2 is energized, which will shift valve spool 93 to the left, as viewed in Fig. 2, whereupon fluid under pressure will flow into bore groove 109, passages 113, 121, 123, 125, 127, 129 and into recess 119, while the recess 117 is connected to tank through passage 115 and bore groove 11. The valve spool 47 is therefore shifted upwardly or inwardly so that passage 65 will be connected with pressure port 53 and fluid will flow therethrough into port 61, through conduit 29 and into cylinder 33 so as to move the piston 35 back to its initial position, the fluid returning from the cylinder through conduit 27, port 55, passageway 59, bore 45, and as the spool land 275 has moved upwardly into recess 117, the fluid can flow through passage 71 into port 67, through conduit 25 to tank, thus effecting a rapid return of the fluid motor to its initial starting position.

Figure 10:
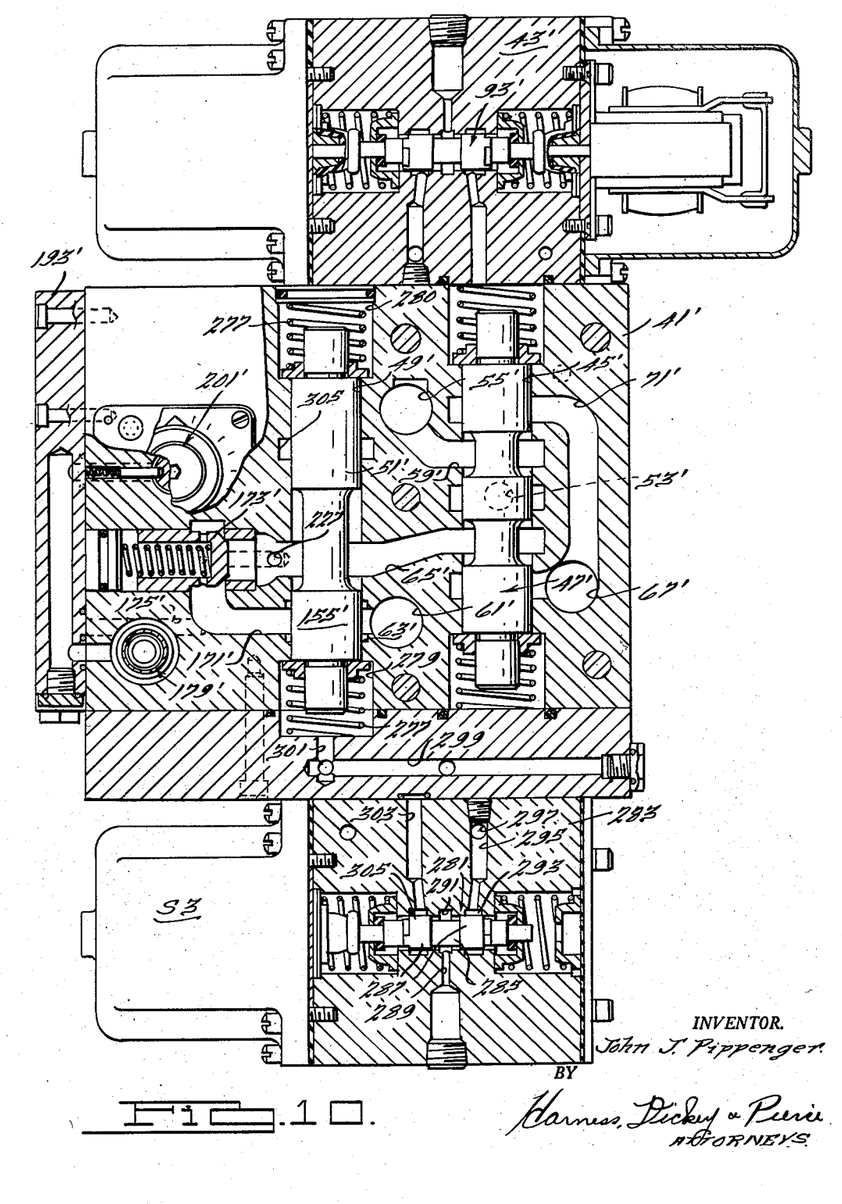
Fig. 10 is a view similar to Fig. 2 illustrating a further embodiment of the invention.
Figure 11:
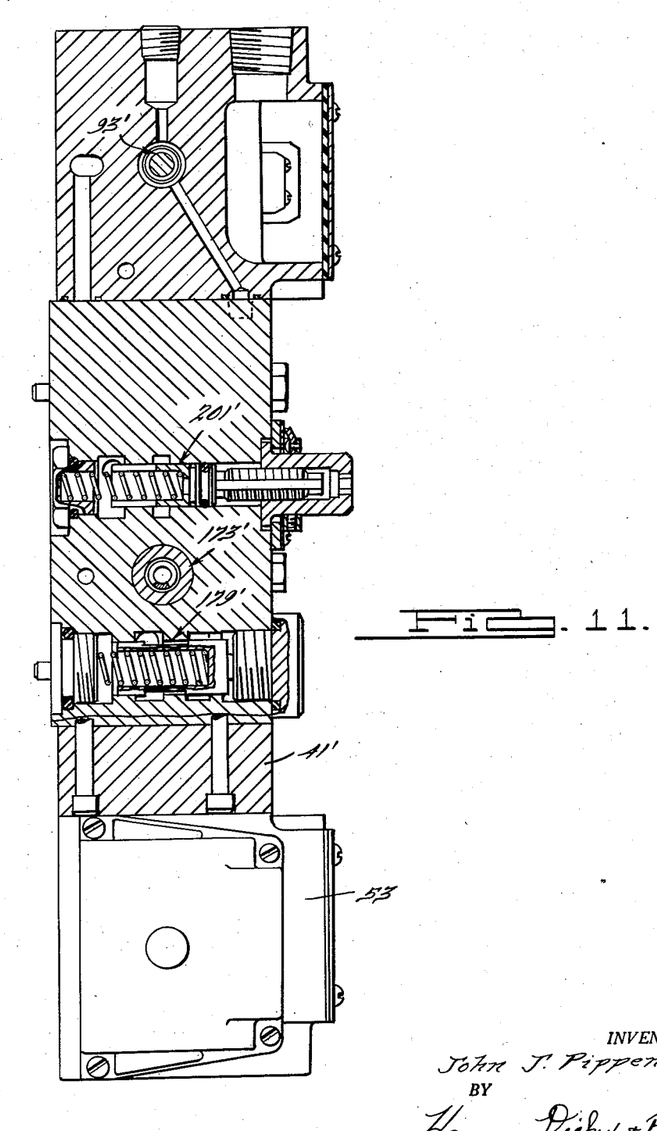
Fig. 11 is an enlarged sectional view of the structure illustrated in Fig. 10, taken along the line 11—11 thereof.

In the embodiment illustrated in Figs. 10 and 11, the selector valve illustrated is substantially identical with that previously described, except that only one restriction or flow-control valve is illustrated, and the second spool is shifted by means of a solenoid-operated pilot valve instead of the roller and cam arrangement previously described. In this embodiment, the valve housing 41' has the pilot spool housing 43' connected therewith and containing pilot valve 93', all substantially as described in the previous embodiment. The two valve spools 47' and 51' are slidably mounted in the bores 45' and 49'. The spool 51' is spring-centered by means of the coil springs 277 disposed in recesses 279 and 280, adjacent the opposite ends of the spool. A single restriction valve 201' is provided, as well as a check valve 173' and a pressure compensating valve 179'. A manifold 193' is connected with the housing 41 for communicating the restriction valve 201' with the bore 49. The spool 47' is shifted by the pilot spool 93' in the same manner as previously described, to control the flow of fluid to the fluid motor and control the direction of movement of the motor. The spool 51', however, is actuated by means of a pilot spool 281 supported in a housing 283 connected with the housing 41'. The pilot valve 281 includes a spool 285 having spaced lands 287 thereon and a main pressure passage 289 is provided in the housing 283 and adapted to be connected either to the main pressure conduit or to a separate pump. Fluid under pressure, therefore, flows through passageway 289 into a bore groove 291. The pilot spool is actuated by means of a solenoid S3 which shifts the same to the right, as illustrated in Fig. 10, upon energization, in substantially the same manner as with the pilot valve previously described. When the pilot spool 285 is shifted to the right, fluid under pressure will flow through the spool bore and an annular groove 293 extending therearound, into a passage 295 in housing 283, then through a passage 297 and through other passages, not shown in detail, into recess 280. In view of the fact that spool 51' is shifted in only one direction, because only one flow-control valve is used, recess 279 is connected to the fluid reservoir as well as to passage 303 in housing 283, which communicates with an annular bore groove 305. When the spool is shifted downwardly in the manner illustrated, spool land 155' will uncover passage 63' so that fluid will flow from port 61' into bore 49', passage 65', bore 45', port 67' and thence to the fluid reservoir, assuming that spool 47' has been shifted downwardly as described in the previous embodiment. Thus, fluid under pressure flows from port 53' to port 55' and to one end of the fluid motor, so as to actuate the same. As the fluid flowing from the opposite end of the motor flows from port 61' to port 67', without passing through the restriction valve, rapid feed is obtained.

When it is desired to feed the fluid motor and thus the associated machine tool, at a slower speed, solenoid S3 is de-energized, thus causing pilot spool 285 to return to the neutral position illustrated wherein there will be no flow to either of the passages 295 or 303 and wherein both passages are connected with the fluid reservoir. The springs 277 will then return spool 51' to the neutral position illustrated wherein if pilot spool 93' is shifted to the right so that spool 47' is moved downwardly, as viewed in Fig. 10, fluid will flow through bore 45', passageway 59' and into port 55' and thence to one end of the fluid motor, while fluid will return from the opposite end of the motor through port 61', passage 63', passage 171', passage 175', pressure compensating valve 179', restriction or flow-control valve 201', substantially as previously described, passage 227 which communicates with the outlet of valve 201', passage 65', bore 45', and port 67' to the fluid reservoir. Thus, as the fluid returning from the motor passes through restriction valve 201', the rate of movement of the motor will be reduced. Likewise, it will be appreciated that the valve is normally disposed in the slow feed position and that solenoid S3 must be actuated before rapid feed can be obtained. This is an added safety feature of this valve.

When it is desired to return the fluid motor to its initial starting position, spool 93' is moved to the left so that the spool 47' is shifted upwardly, whereupon fluid under pressure will flow into port 53', through passage 65', past check valve 173' and through passages 171' and 63' to port 61' and thus to one end of the fluid motor, while fluid will return from the opposite end of the fluid motor, through port 55', passage 59', passage 71', to port 67' and to the fluid reservoir.

It will be appreciated that the solenoid may be energized by means of suitable limit switches provided on the machine tool, so that it may automatically be actuated at any point in the travel of the fluid motor or machine tool moving member. Also, a manual control for the solenoid could be provided. Thus, in the embodiment illustrated in Figs. 10 and 11, only one restriction valve is illustrated, and a different arrangement for actuating the second spool is illustrated, that is, a solenoid-operated pilot valve. It will be appreciated, of course, that a pilot valve could be used in place of the roller and cam arrangement illustrated in the embodiment of Figs. 2 to 9. Therefore, a selector valve has been illustrated and described which can control the movement and rate of movement of a fluid motor, in a relatively simple and inexpensive manner, to permit the better operation of machine tools or other devices, than has been heretofore known.

Figure 12:
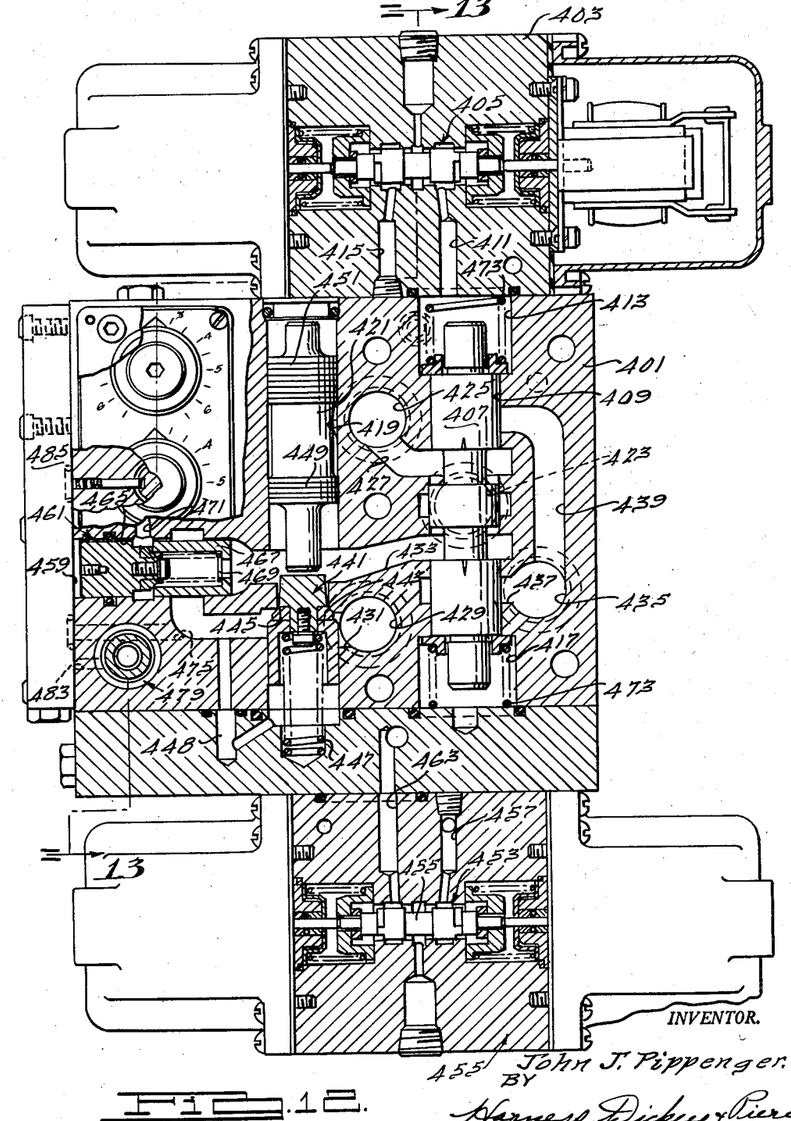
Fig. 12 is a view similar to Fig. 1 illustrating a still further embodiment of the invention.
Figure 13:
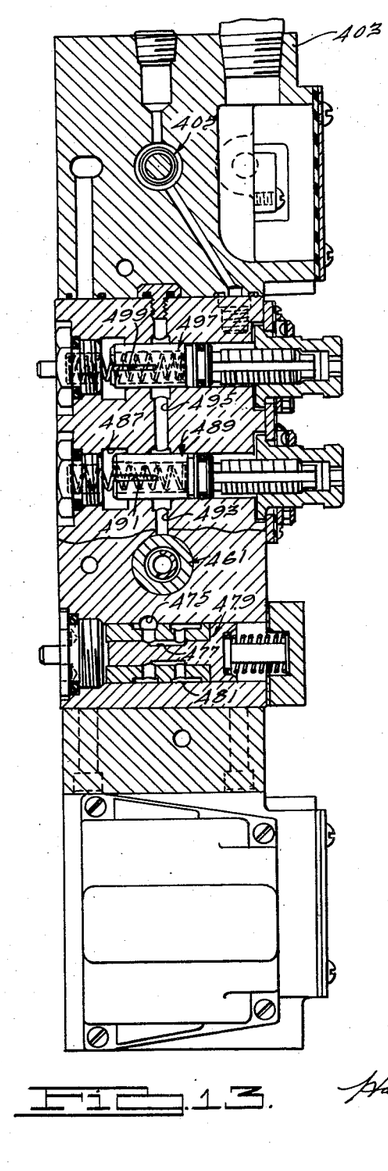
Fig. 13 is a view, partially in section and partially in elevation, taken along the line 13—13 of Fig. 12.

In the embodiment of the invention illustrated in Figs. 12 and 13, the selector valve illustrated is functionally substantially identical with those previously described, except that a poppet valve arrangement is provided in conjunction with the second spool, and pilot spool valves are provided for controlling the position of both the first and second spools. In this embodiment, the valve housing 401 has a pilot spool housing 403 connected therewith and containing a pilot valve 405, substantially as described in the previous embodiment. A directional valve spool 407 is slidably disposed in a first bore 409 in housing 401. Pilot valve 405 controls the position of spool 407 in bore 409 by directing fluid under pressure either through passage 411 into a recess 413 at one end of the spool 409 or through passage 415 into a recess 417 at the opposite end of the spool, so that by shifting the pilot valve 405 through actuation of solenoids, all as previously described, the valve spool 407 can be moved between a first position for causing the piston 35 to move on the work stroke and a second position to return the piston to its starting position. Valve housing 401 is provided with a second bore 419, in which a second spool 421 is slidably disposed. The housing includes a first port 423 which is adapted to be connected to the conduit 23, all as previously described, to supply fluid under pressure to the main valve from the pump 21. Port 423 communicates with the bore 409 intermediate the ends thereof. A second port 425 is provided in the housing and is connectible with conduit 27, which, in turn, is connected with the fluid motor 31. The port 425 is connected with the first bore 409 through a suitable passageway and an annular bore groove 427 in the housing. A third port 429 is connected with conduit 29 leading to the fluid motor 31 on the opposite side of the piston 35 from the conduit 27. Port 429 communicates with the second bore 419 through an annular groove and passageway 431, and bore 419, in turn, is connected with the first bore 409 through a passage 433 in the housing 401. A fourth port 435 is provided in the housing 401 which is connectible with conduit 25 leading to the fluid reservoir 21, and thus acts as a tank port which is connected with the bore 409 adjacent the opposite ends thereof by means of a passageway and groove 437 and a passageway 439.

A poppet or check valve assembly 441 is slidably supported in the bore 419 adjacent the lower end thereof. The assembly 441 includes a valve portion 443 which normally engages a valve seat 445 provided in the bore, so as to prevent fluid from flowing through the second bore between the passages 431 and 433. The poppet valve is normally retained in its seated position by means of a coil spring 447. A drain passage 448 is connected with the underside of the poppet valve to drain any fluid to passage 431, which might accumulate. The second spool 421 is provided with spaced-apart lands 449 and 451. The position of the second spool and poppet valve is controlled by means of a pilot valve 453 supported in a housing 455 connected to the bottom face of the main housing 401. The pilot valve 453 is substantially identical, functionally, to the pilot valve previously described, so that when the pilot valve spool 453 is in its neutral position, fluid flow from the pilot valve to actuate the second spool and poppet valve will not occur. However, when the pilot spool is shifted to the right, as illustrated in Fig. 12, by energizing one of the solenoids, fluid under pressure flows through passageway 457 and thence through suitable passageways in the valve housing 401 into a chamber 459 at the left-hand end of a second poppet or check valve assembly 461. When the pilot spool 453 is shifted to the left, fluid under pressure flows through a passageway 463 into the upper end of the second bore 419 above the land 451, through suitable passageways in the housing 401. When the pilot spool is in this position, the chamber 459 is connected to the tank or reservoir through passageway 457. Similarly, when the pilot valve spool 453 is in the right-hand position, previously described, the upper end of the second bore is connected to tank through the passage 463 and the pilot valve assembly. The poppet valve assembly 461 is slidably supported in a bore 465 which is aligned with passageway 433. When there is no pressure in chamber 459, the poppet valve is held off its seat, against one end of a sleeve 467 by means of a coil spring 469. However, when fluid pressure from the pilot valve 453 is applied in the chamber 459, the poppet valve will be moved against the end of its sleeve and its seat by the fluid pressure, thus preventing a flow of fluid between the interior of the sleeve 467 and thus the passage 433 from a passage 471, which communicates with the bore 465 intermediate the ends thereof, for a purpose which will hereinafter appear. It will also be noted that the sleeve 467 acts to block off the left-hand end of the passageway 431.

When the pilot valve 405 is in a neutral position, spool 407 will be disposed in the neutral position shown whereby in port 423 is blocked so that no fluid under pressure can flow through the main valve to the fluid motor. The spool 407 will be retained in its neutral position by coil springs 473 abutting the opposite ends thereof until pilot valve 405 is actuated, as previously described.

When it is desired to move the piston forwardly at a rapid speed, and thus moving an associated machine tool member at a similar speed, pilot valve 405 is actuated by energization of a solenoid, as previously described, to cause fluid under pressure to flow into recess 413 and act against the upper end of the spool and move the same downwardly. When the spool 407 is thus shifted, port 435 in passage 437 communicates with the bore 409 and with passageway 433. At the same time, pilot valve 453 is actuated by energization of a solenoid so as to apply fluid under pressure against the upper end of spool 421 to move the same downwardly and unseat the poppet valve 441, thereby permitting fluid to flow from the fluid motor cylinder through conduit 29, port 429, passageway 431, bore 419, passageway 433, bore 409, passageway 437, port 435 and conduit 25 to tank. When the spool 407 is moved to its downward position, port 423 is opened to permit fluid under pressure to flow through bore 409 to passage 427 and port 425, and through conduit 27 to fluid motor 31 so as to cause piston 35 to move forwardly at a rapid rate.

When it is desired to slow down the rate of movement of piston 35 and thus the rate of movement of an associated machine tool moving member, pilot spool 455 is shifted to its neutral position, as shown in Fig. 12, by deenergizing the solenoids of pilot valve 453 so that the same is in a neutral position, thus permitting poppet valve 441 to close. When the poppet valve is closed, the flow of fluid returning to tank is restricted so as to slow up movement of the piston 35. This results from the fact that the poppet valve 441 blocks the flow of fluid from the passage 431 through the bore 419 to the passage 433. Fluid, therefore, flows from port 429 through passage 431 and around the spool. Fluid cannot flow past the sleeve 467, and, therefore, flows into passageway 475 into the bore 477 of a pressure compensating valve 479, which is functionally similar to the pressure compensating valve previously described. Fluid will flow into a groove 481 in the pressure compensating valve, which, in turn, is in communication with an outlet passage 483. The fluid flowing through passage 483 will flow into a manifold 485, as previously described, and into a bore 487 of an adjustable speed-control or restriction valve 489, which is functionally identical to the valve previously described. The fluid under pressure in the bore 487 will flow through the notch 491 into an outlet passage 493, past the open poppet valve 461, through the sleeve 467 into passage 433, thence into bore 409, passage 437, port 435 and back to tank. The restriction in the valve 489 can be varied as previously pointed out.

If it is desired to additionally slow down the feeding of the machine tool member and therefore the speed of movement of piston 35 of the fluid motor, pilot valve 453 is actuated so as to direct fluid under pressure into chamber 459, thus closing poppet valve 461, while leaving poppet valve 441 in its closed position. The fluid will thus flow into the adjustable speed-control or restriction valve 489 as just described. However, in view of the fact that the poppet valve 461 has been moved to its closed position, fluid cannot flow from the restriction valve 489 through passage 493 and past poppet valve 461. The fluid will thus be forced to flow through passage 495 into a second adjustable speed-control or restriction valve 497 which is substantially identical to the valve previously described. The fluid will flow out of valve 497 through the notch 499 which communicates with the passage 495, and the amount of restriction in this valve is controlled by adjusting the knob in the manner previously described. Fluid will flow from the valve 497 through suitable passageways in the manifold 485 and the housing 401 to bore 409, passage 437, port 435 and back to tank, thus permitting, for example, fine feed cutting operations to take place.

It will be appreciated that the movement of the fluid motor, as well as the associated tool, may be stopped at any time by merely deenergizing the solenoids of the pilot valve 405, thereby returning the pilot spool to its neutral position so that the springs 473 will return the spool 407 to its neutral position wherein port 423 will be blocked to prevent any further flow of fluid to the fluid motor, thus causing the fluid motor to dwell at any desired point. When, thereafter, it is desired to start the fluid motor, it is merely necessary to energize the pilot spool solenoids and the motor will continue to operate and move in a desired direction.

After the moving member of a machine tool or the like reaches the end of its work stroke, and it is desired to return the same to its starting position, the solenoid of pilot valve 405 is energized so as to shift the pilot valve to the left, as previously described, whereupon fluid under pressure will flow into recess 417 while recess 413 is connected to tank through the pilot valve 405. The valve spool 407 is, therefore, shifted upwardly or inwardly so that passage 433 will be connected with pressure port 423 and fluid will flow through the passage so as to open poppet valve 441, and into port 429, through conduit 29 and into cylinder 33 so as to move the piston back to its initial position. The fluid pressure in passage 433 will be sufficient to open poppet valve 441 to permit this flow to take place in an unrestricted manner. Fluid will return from the cylinder through conduit 27, port 425, passageway 427, bore 409, through passage 439 into port 435 and through conduit 25 to tank, thus effecting a rapid return of the fluid motor to its initial starting position.

It will thus be appreciated that in this embodiment the poppet valves, supported in their bores, replace the second spool described in previous embodiments. However, in all embodiments, valve means, in the form of either a spool or in the form of poppet valves, are provided and the valve assemblies of the embodiments function to the same end. It will, furthermore, be appreciated that the valve of Figs. 12 and 13 could be modified to incorporate only one flow-control valve, as previously described.

What is claimed is:

1. A selector valve assembly for use in operating a fluid motor at various speeds and which may be actuated to cause such motor to dwell at any time during its operations, including housing means, said housing means having a first bore therein, a spool slidably supported in said first bore, said spool including spaced lands and grooves for permitting or preventing fluid flow to certain portions of said bore and ports or passageways communicating therewith, said housing means having additional bore means therein, valve means movably supported in said additional bore means, said housing means having a first port in communication with said first bore and adapted to be connected to a source of fluid pressure, said housing means having a second port communicating with said first bore and adapted to be connected to a fluid motor, said housing means having a third port communicating with said additional bore means and adapted to be connected to a fluid motor, said housing means having a fourth port communicating with said first bore and adapted to be connected with a fluid reservoir, said housing means having a first passageway connecting said first bore with said additional bore means and said valve means, said first spool being normally disposed in a first position wherein it blocks said port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said valve means having a first position which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means for said flow control valve, fluid outlet passage means in said housing means for said flow control valve, said valve means having a second position which, when said first spool is in said second position so as to connect said first port with said second port, will connect said third port with said flow control valve inlet passage means and said flow control valve outlet passage means with said first bore so that fluid flowing through said third port can flow into said flow control valve and out through said flow control valve outlet passage means to said first bore, whereby restriction in said flow control valve will reduce the speed of movement of the associated fluid motor, said first spool being shiftable to a third position for use in reversing the direction of movement of an associated fluid motor in which said first port is connected with said third port and said second port is connected with said fourth port, means for actuating said first spool, and means for actuating said valve means, said spool and said valve means being independently actuatable and actuatable irrespective of the position of the other.

2. A selector valve assembly for use in operating a fluid motor at various speeds and which may be actuated to cause such motor to dwell at any time during its operations, including housing means, said housing means having a first bore therein, a spool slidably supported in said first bore, said spool including spaced lands and grooves for permitting or preventing fluid flow of certain portions of said bore and ports or passageways communicating therewith, said housing means having additional bore means therein, valve means movably supported in said additional bore means, said housing means having a first port in communication with said first bore and adapted to be connected to a source of fluid pressure, said housing means having a second port communicating with said first bore and adapted to be connected to a fluid motor, said housing means having a third port communicating with said additional bore means and adapted to be connected to a fluid motor, said housing means having a fourth port communicating with said first bore and adapted to be connected with a fluid reservoir, said housing means having a first passageway connecting said first bore with said additional bore means and said valve means, said first spool being normally disposed in a first position wherein it blocks said port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said valve means having a first position which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means for said flow control valve, fluid outlet passage means in said housing means for said flow control valve, said valve means having a second position which, when said first spool is in said second position so as to connect said first port with said second port, will connect said third port with said flow control valve inlet passage means and said flow control valve outlet passage means with said first bore so that fluid flowing through said third port can flow into said flow control valve and out through said flow control valve outlet passage means to said first bore, whereby restriction in said flow control valve will reduce the speed of movement of the associated fluid motor, a second flow control valve in said housing means adapted to restrict the flow of fluid therethrough, passageway means connecting said second flow control valve with said first flow control valve, said second flow control valve having outlet passage means communicating with said first bore, said valve means being actuatable to a third position which, when said first spool is in said second position so as to connect said first port with said second port, will connect said third port with said first flow control valve inlet passage means, while blocking off flow from said first flow control valve outlet passage means, while connecting said second flow control valve outlet passage means with said first bore so that fluid flowing through said third port will flow into said first flow control valve through said second flow control valve and out said second flow control valve outlet passage means into said first bore, whereby additional restriction in said second flow control valve will further reduce the speed of the associated fluid motor, said first spool being shiftable to a third position for use in reversing the direction of movement of an associated fluid motor in which said first port is connected with said third port and said second port is connected with said fourth port, means for actuating said first spool, and means for actuating said valve means, said spool and said valve means being independently actuatable and actuatable irrespective of the position of the other.

3. A selector valve assembly for use in operating a fluid motor at various speeds and which may be actuated to cause such motor to dwell at any time during its operations, including housing means, said housing means having a first bore therein, a spool slidably supported in said first bore, said spool including spaced lands and grooves for permitting or preventing fluid flow to certain portions of said bore and ports or passageways communicating therewith, said housing means having additional bore means therein, valve means movably supported in said additional bore means, said housing means having a first port in communication with said first bore and adapted to be connected to a source of fluid pressure, said housing means having a second port communicating with said first bore and adapted to be connected to a fluid motor, said housing means having a third port communicating with said additional bore means and adapted to be connected to a fluid motor, said housing means having a fourth port communicating with said first bore and adapted to be connected with a fluid reservoir, said housing means having a first passageway connecting said first bore with said additional bore means and said valve means, said first spool being normally disposed in a first position wherein it blocks said port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said valve means having a first position which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means for said flow control valve, fluid outlet passage means in said housing means for said flow control valve, said valve means having a second position which, when said first spool is in said second position so as to connect said first port with said second port, will connect said third port with said flow control valve inlet passage means and said flow control valve outlet passage means with said first bore so that fluid flowing through said third port can flow into said flow control valve and out through said flow control valve outlet passage means to said first bore, whereby restriction in said flow control valve will reduce the speed of movement of the associated fluid motor, a second flow control valve in said housing means adapted to restrict the flow of fluid therethrough, passageway means connecting said second flow control valve with said first flow control valve, said second flow control valve having outlet passage means communicating with said first bore, said valve means being actuatable to a third position which, when said first spool is in said second position so as to connect said first port with said second port, will connect said third port with said first flow control valve inlet passage means, while blocking off flow from said first flow control valve outlet passage means, while connecting said second flow control valve outlet passage means with said first bore so that fluid flowing through said third port will flow into said first flow control valve through said second flow control valve and out said second flow control valve outlet passage means into said first bore, whereby additional restriction in said second flow control valve will further reduce the speed of the associated fluid motor, said first spool being shiftable to a third position for use in reversing the direction of movement of an associated fluid motor in which said first port is connected with said said third port and said second port is connected with said fourth port, resilient means normally retaining said first spool in said first position, a solenoid-operated pilot valve operatively connected with said first bore and actuatable to move said first spool to said second or third position, and solenoid-operated pilot valve means for actuating said valve means, said spool and said valve means being independently actuatable and actuatable irrespective of the position of the other.

4. A selector valve assembly for use in operating a fluid motor at various speeds and which may be actuated to cause such motor to dwell at any time during its operations, including housing means, said housing means having a first bore therein, a spool slidably supported in said first bore, said housing means having a second bore therein, a spool slidably supported in said second bore, each of said spools including spaced lands and grooves for permitting or preventing fluid flow to certain portions of said bores and ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said second bore and adapted to be connected to a fluid motor, said housing means having a fourth port communicating with said first bore and adapted to be connected with a fluid reservoir, said housing means having a first passageway connecting said first and second bores, said first spool being normally disposed in a first position wherein it blocks said first port and prevents a flow of fluid into said first bore and thus to any of said other ports, so that an associated fluid motor will dwell when said first spool is in said first position, said first spool being shiftable to a second position wherein said first port is connected with said second port and said first passageway is connected with said fourth port, said second spool having a first position in said second bore which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means communicating said flow control valve with said second bore, fluid outlet passageway means in said housing means communicating said flow control valve with said second bore at a point spaced from said fluid inlet passage means, said second spool having a second position in said second bore which, when said first spool is in said second position so as to connect said first port with said second port, will connect said third port with said flow control valve inlet passageway means and said flow control valve outlet passageway means with said first passageway, so that fluid flowing through said third port can flow into said flow control valve and out through said flow control valve outlet passageway means, and said second bore to said first passageway, whereby restriction in said flow control valve will reduce the speed of movement of the associated fluid motor, said first spool being shiftable to a third position for use in reversing the direction of movement of an associated fluid motor in which said first port is connected with said third port and said second port is connected with said fourth port, means for actuating said first spool, and means for actuating said second spool, each of said spools being independently actuatable and actuatable irrespective of the position of the other spool.

5. A selector valve assembly for use in operating a fluid motor at various speeds and which may be actuated to cause such motor to dwell at any time during its operations, including housing means, said housing means having a first bore therein, a spool slidably supported in said first bore, said housing means having a second bore therein, a spool slidably supported in said second bore, each of said spools including spaced lands and grooves for use in permitting or preventing fluid flow to certain portions of said bores and ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said second bore and adapted to be connected to a fluid motor, said housing means having a fourth port communicating with said first bore and adapted to be connected with a fluid reservoir, said housing means having a first passageway connecting said first and second bores, said first spool being normally disposed in a first position wherein it blocks said first port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said second spool being shiftable to a first position which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means communicating said flow control valve with said second bore, fluid outlet passageway means in said housing means communicating said flow control valve with said second bore at a point spaced from said fluid inlet passage means, said second spool being shiftable to a second position which, when said first spool is in said second position so as to connect said first port with said second port, will connect said third port with said flow control valve inlet passageway means and said flow control valve outlet passageway means with said first passageway, so that fluid flowing through said third port can flow into said flow control valve and out through said flow control valve outlet passageway means, and said second bore to said first passageway, whereby restriction in said flow control valve will reduce the speed of movement of the associated fluid motor, a second flow control valve in said housing means adapted to restrict the flow of fluid therethrough, passageway means connecting said second flow control valve with said first flow control valve, said second flow control valve having outlet passage means communicating with said second bore and said second spool being shiftable to a third position which, when said first spool is in said second position so as to connect said first port with said second port, will connect said third port with said first flow control valve inlet passage means, while blocking off flow from said first flow control outlet passage means, while connecting said second flow control outlet passage means with said first passageway so that fluid flowing through said third port will flow into said first flow control valve through said second flow control valve and out said second flow control valve outlet passage means into said first passageway whereby additional restriction in said second flow control valve will further reduce the speed of the associated fluid motor, said first spool being shiftable to a third position for use in reversing the direction of movement of an associated fluid motor in which said first port is connected with said third port and said second port is connected with said fourth port, means for actuating said first spool, and means for actuating said second spool, each of said spools being independently actuatable and actuatable irrespective of the position of the other spool.

6. A selector valve assembly for use in operating a fluid motor at various speeds and which may be actuated to cause such motor to dwell at any time during its operations, including housing means, said housing means having a first bore therein, a spool slidably supported in said first bore, said housing means having a second bore therein, a spool slidably supported in said second bore, each of said spools including spaced lands and grooves for use in permitting or preventing fluid flow to certain portions of said bores and ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said second bore and adapted to be connected to a fluid motor, said housing means having a fourth port communicating with said first bore and adapted to be connected with a fluid reservoir, said housing means having a first passageway connecting said first and second bores, said first spool being normally disposed in a first position wherein it blocks said first port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said second spool being shiftable to a first position which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means communicating said flow control valve with said second bore, fluid outlet passageway means in said housing means communicating said flow control valve with said second bore at a point spaced from said fluid inlet passage means, said second spool being shiftable to a second position which, when said first spool is in said second position so as to connect said first port with said second port, will connect said third port with said flow control valve inlet passageway means and said flow control valve outlet passageway means with said first passageway, so that fluid flowing through said third port can flow into said flow control valve and out through said flow control valve outlet passageway means, and said second bore to said first passageway, whereby restriction in said flow control valve will reduce the speed of movement of the associated fluid motor, a second flow control valve in said housing means adapted to restrict the flow of fluid therethrough, passageway means connecting said second flow control valve with said first flow control valve, said second flow control valve having outlet passage means communicating with said second bore and said second spool being shiftable to a third position which, when said first spool is in said second position so as to connect said first port with said second port, will connect said third port with said first flow control valve inlet passage means, while blocking off flow from said first flow control outlet passage means, while connecting said second flow control outlet passage means with said first passageway so that fluid flowing through said third port will flow into said first flow control valve through said second flow control valve and out said second flow control valve outlet passage means into said first passageway, whereby additional restriction in said second flow control valve will further reduce the speed of the associated fluid motor, said first spool being shiftable to a third position for use in reversing the direction of movement of an associated fluid motor in which said first port is connected with said third port and said second port is connected with said fourth port, resilient means normally retaining said first spool in said first position, a solenoid-operated pilot valve operatively connected with said first bore actuatable to move said first spool to said second or third position, and means for actuating said second spool, each of said spools being independently actuatable and actuatable irrespective of the position of the other spool.

7. A selector valve assembly for use in operating a fluid motor at various speeds and which may be actuated to cause such motor to dwell at any time during its operations, including housing means, said housing means having a first bore therein, a spool slidably supported in said first bore, said housing means having a second bore therein, a spool slidably supported in said second bore, each of said spools including spaced lands and grooves for permitting or preventing fluid flow to certain portions of said bores and ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said second bore and adapted to be connected to a fluid motor, said housing means having a fourth port communicating with said first bore and adapted to be connected with a fluid reservoir, said housing means having a first passageway connecting said first and second bores, said first spool being normally disposed in a first position wherein it blocks said first port and prevents a flow of fluid into said first bore and thus to any of said other ports, so that an associated fluid motor will dwell when said first spool is in said first position, said first spool being shiftable to a second position wherein said first port is connected with said second port and said first passageway is connected with said fourth port, said second spool having a first position in said second bore which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means communicating said flow control valve with said second bore, fluid outlet passageway means in said housing means communicating said flow control valve with said second bore at a point spaced from said fluid inlet passage means, said second spool having a second position in said second bore which, when said first spool is in said second position so as to connect said first port with said second port, will connect said third port with said flow control valve inlet passageway means and said flow control valve outlet passageway means with said first passageway so that fluid flowing through said third port can flow into said flow control valve and out through said flow control valve outlet passageway means, and said second bore to said first passageway, whereby restriction in said flow control valve will reduce the speed of movement of the associated fluid motor, said first spool being shiftable to a third position for use in reversing the direction of movement of an associated fluid motor in which said first port is connected with said third port and said second port is connected with said fourth port, resilient means normally retaining said first spool in said first position, a solenoid-operated pilot valve operatively connected with said first bore actuatable to move said first spool to said second or third position, and means for actuating said second spool, each of said spools being independently actuatable and actuatable irrespective of the position of the other spool.

8. A selector valve assembly for use in operating a fluid motor at various speeds and which may be actuated to cause such motor to dwell at any time during its operations, including housing means, said housing means having a first bore therein, a spool slidably supported in said firt bore, said housing means having a second bore therein, a spool slidably supported in said second bore, each of said spools including spaced lands and grooves for permitting or preventing fluid flow to certain portions of said bores and ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said second bore and adapted to be connected to a fluid motor, said housing means having a fourth port communicating with said first bore and adapted to be connected with a fluid reservoir, said housing means having a first passageway connecting said first and second bores, said first spool being normally disposed in a first position wherein it blocks said first port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said second spool having a first position in said second bore which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means communicating said flow control valve with said second bore, fluid outlet passageway means in said housing means communicating said flow control valve with said second bore at a point spaced from said fluid inlet passage means, said second spool having a second position in said second bore which, when said first spool is in said second position so as to connect said first port with said second port, will connect said third port with said flow control valve inlet passageway means and said flow control valve outlet passageway means with said first passageway so that fluid flowing through said third port can flow into said flow control valve and out through said flow control valve outlet passageway means, and said second bore to said first passageway, whereby restriction in said flow control valve will reduce the speed of movement of the associated fluid motor, said first spool being shiftable to a third position for use in reversing the direction of movement of an associated fluid motor in which said first port is connected with said third port and said second port is connected with said fourth port, resilient means normally retaining said second spool in said first position, and a solenoid-operated pilot spool operatively connected with said second bore and actuatable to move said second spool to said first position, each of said spools being independently actuatable and actuatable irrespective of the position of the other spool.

9. A selector valve assembly for use in operating a fluid motor at various speeds and which may be actuated to cause such motor to dwell at any time during its operations, including housing means, said housing means having a first bore therein, a spool slidably supported in said first bore, said housing means having a second bore therein, a spool slidably supported in said second bore, each of said spools including spaced lands and grooves for use in permitting or preventing fluid flow to certain portions of said bores and ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said second bore and adapted to be connected to a fluid motor, said housing means having a fourth port communicating with said first bore and adapted to be connected with a fluid reservoir, said housing means having a first passageway connecting said first and second bores, said first spool being normally disposed in a first position wherein it blocks said first port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said second spool being shiftable to a first position which, when said first spool is in said second position, will connect said first passageway with said third port so that fluid will flow directly from said first port to said second port and thus to a fluid motor and fluid will flow from said third port through said first passage to said fourth port, said valve assembly including a flow control valve adapted to restrict the flow of fluid therethrough, fluid inlet passage means in said housing means communicating said flow control valve with said second bore, fluid outlet passageway means in said housing means communicating said flow control valve with said second bore at a point spaced from said fluid inlet passage means, said second spool being shiftable to a second position which, when said first spool is in said second position so as to connect said first port with said second port, will connect said third port with said flow control valve inlet passageway means and said flow control valve outlet passageway means with said first passageway so that fluid flowing through said third port can flow into said flow control valve and out through said flow control valve outlet passageway means, and said second bore to said first passageway, whereby restriction in said flow control valve will reduce the speed of movement of the associated fluid motor, a second flow control valve in said housing means adapted to restrict the flow of fluid therethrough, passageway means connecting said second flow control valve with said first flow control valve, said second flow control valve having outlet passage means communicating with said second bore and said second spool being shiftable to a third position which, when said first spool is in said second position so as to connect said first port with said second port, will connect said third port with said first flow control valve inlet passage means, while blocking off flow from said first flow control outlet passage means, while connecting said second flow control outlet passage means with said first passageway so that fluid flowing through said third port will flow into said first flow control valve through said second flow control valve and out said second flow control valve outlet passage means into said first passageway, whereby additional restriction in said second flow control valve will further reduce the speed of the associated fluid motor, said first spool being shiftable to a third position for use in reversing the direction of movement of an associated fluid motor in which said first port is connected with said third port and said second port is connected with said fourth port, resilient means normally retaining said first spool in said first position, a solenoid-operated pilot valve operatively connected with said first bore actuatable to move said first spool to said second or third position, means connected with said second spool outwardly of said housing means and adapted to be engaged by a cam or the like so as to shift said second spool to said various positions, and cooperating detent means on said second spool and in said housing means for releasably retaining said second spool in a predetermined position, each of said spools being independently actuatable and actuatable irrespective of the position of the other spool.

10. The structure recited in claim 4 wherein the restriction to fluid flow provided by said flow control valve may be varied and means disposed exteriorly of said housing means and connected to said flow control valve actuatable to vary the restriction in said flow control valve.

11. The structure recited in claim 5 wherein the restriction to fluid flow provided by each of said flow control valves may be varied, and means disposed exteriorly of said housing means adjacent to and connected with each of said flow control valves actuatable to vary the restriction in each of said flow control valves.

12. A selector valve assembly for use in operating an associated fluid motor at various speeds, including housing means having a first port connectible to a source of fluid under pressure, a second port connectible to a fluid motor, a third port connectible to a fluid motor and a fourth port connectible to a reservoir or tank, a directional valve disposed in said housing means actuatable to selectively connect either said first port with said second port or said third port and said fourth port with the other of said second or third ports, a flow control valve in said housing means providing restriction to the flow of fluid therethrough, a diversion valve in said housing means and connected between said directional valve and one of said fluid motor ports, said diversion valve being connected also with said flow control valve and being movable between a first position wherein fluid flowing from an associated fluid motor through one of said fluid motor ports flows to said fourth port directly through said directional valve and a second position wherein fluid flowing from an associated fluid motor through said one of said fluid motor ports flows through said flow control valve and said directional valve to said fourth port to thereby slow down the speed of movement of an associated motor, means for actuating said directional valve, and independent means for actuating said diversion valve.

13. The structure recited in claim 11 wherein a second flow control valve is disposed in said housing means between said first flow control valve and said diversion valve, and said diversion valve is movable to a third position wherein fluid flowing from an associated fluid motor through said one of said fluid motor ports flows through both of said flow control valves and said directional valve to said fourth port to thereby further slow down the speed of movement of an associated fluid motor.

14. The structure as claimed in claim 11 wherein said directional valve is normally positioned so as to prevent a flow of fluid from said first port to either of said fluid motor ports so that an associated fluid motor will dwell whenever said direction valve is disposed in said normal position.

15. A selector valve assembly for use in operating a fluid motor at various speeds and which may be actuated to cause such motor to dwell at any time during its operations, including housing means, said housing means having a first bore therein, a spool slidably supported in said first bore, said housing means having a second bore therein, a normally closed poppet valve movably supported in said second bore, said spool including spaced lands and grooves for permitting or preventing fluid flow to certain portions of said bores and to ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said second bore and adapted to be connected to a fluid motor, said housing means having a fourth port communicating with said first bore and adapted to be connected with a fluid reservoir, said housing means having a first passageway connecting said first bore with said second bore, said first spool being normally disposed in a first position wherein it blocks said first port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said poppet valve means having a first position in said second bore wherein said poppet valve means is open so that when said first spool is in said second position said first passageway will be connected with said third port so that fluid will flow directly from said first port to second port and thus to a fluid motor and whereby fluid will flow from said third port through said first passage to said fourth port, said valve assembly including a flow control valve adapted to restrict the flow of fluid therethrough, fluid inlet passage means in said housing means communicating said second flow control valve with said second bore, fluid outlet passage means in said housing means communicating said flow control valve with said second bore at a point spaced from said fluid inlet passage means, said poppet valve means having a second normally closed position in said second bore which, when said first spool is in said second position so as to connect said first port with said second port, will connect said third port with said flow control valve inlet passage means and said flow control valve outlet passage means with said first passageway, so that fluid flowing through said third port can flow into said flow control valve and out through said flow control valve outlet passage means and said second bore to said first passageway, whereby restriction in said flow control valve will reduce the speed of movement of the associated fluid motor, said first spool being shiftable to a third position for use in reversing the direction of movement of an associated fluid motor in which said first port is connected with said third port and said second port is connected with said fourth port, means for actuating said first spool, and means for actuating said poppet valve means, said spool and said poppet valve means being independently actuatable and actuatable irrespective of the position of the other.

16. A selector valve assembly for use in operating a fluid motor at various speeds and which may be actuated to cause such motor to dwell at any time during its operations, including housing means, said housing means having a first bore therein, a spool slidably supported in said first bore, said housing means having additional bore means therein, poppet valve means movably supported in said additional bore means, said poppet valve means including a first normally closed poppet valve and a second normally open poppet valve, said spool including spaced lands and grooves for permitting or preventing fluid flow to certain portions of said bore and bore means and to ports or passageways communicating therewith, said housing means having a first port in communication with said first bore and adapted to be connected to a source of fluid pressure, said housing means having a second port communicating with said first bore and adapted to be connected to a fluid motor, said housing means having a third port communicating with said additional bore means and adapted to be connected to a fluid motor, said housing means having a fourth port communicating with said first bore and adapted to be connected with a fluid reservoir, said housing means having a first passageway connecting said first bore with said additional bore means, said first spool being normally disposed in a first position wherein it blocks said first port and prevents a flow of fluid into said first bore and thus to any of said other ports so that an associated fluid motor will dwell when said first spool is in said first position, said first spool being shiftable to a second position wherein said first port is connected with said second port and said first passageway is connected with said fourth port, said poppet valve means having a first position in said additional bore means in which both of said poppet valves are open so that when said first spool is in said second position said first passageway will be connected with said third port so that fluid will flow directly from said first port to said second port and thus to a fluid motor and so that fluid will flow from said third port through said first passageway to said fourth port, said valve assembly including a flow control valve adapted to restrict the flow of fluid therethrough, fluid inlet passage means in said housing means communicating said flow control valve with said additional bore means, fluid outlet passage means in said housing means communicating said flow control valve with said additional bore means at a point spaced from said fluid inlet passage means, said poppet valve means having a second position in said additional bore means in which said first poppet valve is closed and said second poppet valve is open so that when said first spool is in said second position so as to connect said first port with said second port, said third port will be connected with said flow control valve inlet passage means and said flow control valve outlet passage means with said first passageway, so that fluid flowing through said third port can flow into said flow control valve and out through said flow control valve outlet passage means and said additional bore to said first passageway, whereby restriction in said flow control valve will reduce the speed of movement of the associated fluid motor, a second flow control valve in said housing means adapted to restrict the flow of fluid therethrough, passageway means connecting said second flow control valve with said first flow control valve, said second flow control valve having outlet passageway means communicating with said first bore, said poppet valve means being actuatable to a third position in which said first poppet valve is closed and said second poppet valve is closed so that when said first spool is in said second position so as to connect said first port with said second port, said third port will be connected with said first flow control valve inlet passage means while blocking off flow from said first flow control outlet passage means and while connecting said second flow control outlet passage means with said first bore so that fluid flowing through said third port will flow into said first flow control valve through said second flow control valve and out of said second flow control valve outlet passage means into said first bore, whereby additional restriction in said second flow control valve will further reduce the speed of the associated fluid motor, said first spool being shiftable to a third position for use in reversing the direction of movement of an associated fluid motor in which said first port is connected with said third port and said second port is connected with said fourth port, means for actuating said first spool, and means for actuating said poppet valve means, said spool and said poppet valve means being independently actuatable and actuatable irrespective of the position of the other.

References Cited in the file of this patent

UNITED STATES PATENTS

| | | |
|---|---|---|
| 2,365,748 | Curtis | Dec. 26, 1944 |
| 2,374,243 | Somes | Apr. 24, 1945 |
| 2,375,255 | Snader | May 8, 1945 |
| 2,565,600 | Esterline | Aug. 28, 1951 |